US011840972B2

(12) United States Patent
Vit et al.

(10) Patent No.: US 11,840,972 B2
(45) Date of Patent: Dec. 12, 2023

(54) METHOD AND SYSTEM FOR CALIBRATING DESIRABLE ENGINE SPEED FOR POWER TAKE-OFF OPERATIONS

(71) Applicant: Daimler Truck AG, Leinfelden-Echterdingen (DE)

(72) Inventors: Robert Vit, Vancouver, WA (US); Andreas Lang, Stuttgart (DE); Joshua Crawford, Lake Oswego, OR (US); Kathryn Paul, Corbett, OR (US); Edward Pack, Statesville, NC (US); Gregory Hoiland, Beaverton, OR (US)

(73) Assignee: Daimler Truck AG, Leinfelden-Echterdingen (DE)

( * ) Notice: Subject to any disclaimer, the term of this patent is extended or adjusted under 35 U.S.C. 154(b) by 0 days.

(21) Appl. No.: 17/640,244

(22) PCT Filed: Sep. 2, 2020

(86) PCT No.: PCT/EP2020/074464
§ 371 (c)(1),
(2) Date: Mar. 3, 2022

(87) PCT Pub. No.: WO2021/043822
PCT Pub. Date: Mar. 11, 2021

(65) Prior Publication Data
US 2022/0341365 A1 Oct. 27, 2022

(30) Foreign Application Priority Data
Sep. 3, 2019 (IN) .............................. 201941035478

(51) Int. Cl.
*F02D 31/00* (2006.01)
*F02D 29/00* (2006.01)
*B60K 17/28* (2006.01)

(52) U.S. Cl.
CPC ........... *F02D 31/001* (2013.01); *F02D 29/00* (2013.01); *B60K 17/28* (2013.01)

(58) Field of Classification Search
CPC ...... F02D 31/001; F02D 29/00; F02D 41/021; F02D 2200/604; B60K 17/28
See application file for complete search history.

(56) References Cited

U.S. PATENT DOCUMENTS

2002/0010534 A1* 1/2002 Goodnight ........ B60W 30/1882
701/54

FOREIGN PATENT DOCUMENTS

EP    1 172 248 A2    1/2002
EP    2 527 626 A1    11/2012
(Continued)

OTHER PUBLICATIONS

International Search Report and Written Opinion received for PCT Patent Application No. PCT/EP2020/074464, dated Nov. 16, 2020, 12 pages.

(Continued)

*Primary Examiner* — Sizo B Vilakazi
(74) *Attorney, Agent, or Firm* — Shook, Hardy & Bacon L.L.P.

(57) ABSTRACT

The present invention relates to a system and method of calibrating a desirable engine speed for power take-off (PTO) operation. In particular, the present invention discloses having an instrument cluster unit (ICU) (102) that allows an operator to select a fourth desirable speed value for PTO operation, and a signal actuating module (SAM) (104) that may be configured to receive the value from the ICU (102) and store the value in its memory. Further, the present invention describes having a common power-train control unit (CPC) connected to the SAM (104) and configured to receive the desirable speed value from the SAM (Continued)

(104), and in response, modify one or more engine parameters to attain the desirable speed value for operating an engine PTO.

13 Claims, 4 Drawing Sheets

(56) References Cited

FOREIGN PATENT DOCUMENTS

| | | | |
|---|---|---|---|
| JP | 10220273 A | * | 8/1998 |
| JP | H10-220273 A | | 8/1998 |
| KR | 101962971 B1 | | 3/2019 |

OTHER PUBLICATIONS

International Preliminary Report on Patentability received for PCT Application No. PCT/EP2020/074464, dated Mar. 17, 2022, 11 pages.

* cited by examiner

METHOD AND SYSTEM FOR CALIBRATING DESIRABLE ENGINE SPEED FOR POWER TAKE-OFF OPERATIONS

CROSS-REFERENCE TO RELATED APPLICATIONS AND PRIORITY CLAIM

This application is a 371 national stage of PCT Application No. PCT/EP2020/074464, filed on Sep. 2, 2020, and titled METHOD AND SYSTEM FOR CALIBRATING DESIRABLE ENGINE SPEED FOR POWER TAKE-OFF OPERATIONS," which claims priority to Indian Patent App. No. 201941035478, filed on Sep. 3, 2019, and titled "METHOD AND SYSTEM FOR CALIBRATING DESIRABLE ENGINE SPEED FOR POWER TAKE-OFF OPERATIONS." The contents of these referenced priority applications is incorporated herein in the entirety.

PREAMBLE TO THE DESCRIPTION

The following specification particularly describes the invention and the manner in which it is to be performed:

DESCRIPTION OF THE INVENTION

Technical Field

The present disclosure generally relates to a method for calibrating a desirable engine speed for power take-off operations. Particularly, the present invention relates to a system and method for allowing an operator to calibrate a fourth engine speed for power take-off operations in vocational trucks.

Background of the Disclosure

Vocational trucks find numerous applications in today's world, such as for: firefighting, concreate mixers, suction excavators, heavy drillers, etc. To perform any vocational functions, these trucks include specialized equipment, which is different for each vocational function, mounted on the truck body. Since, this specialized equipment does not have its own power, they take their power from the engine of the truck. To make this possible, a transmission of the engine is attached to the specialized equipment mounted on the truck using a power take-off (PTO) assembly. More specifically, the PTO is a device that connects mechanical power, originating at the engine, to the specialized equipment mounted at the back of the truck. In some configurations, multiple PTOs can be installed and simultaneously utilized on a single vehicle.

Often, vocational trucks come with factory fitted speed settings that cannot be altered by the operator on their own. In particular, many vocational trucks come with three pre-set engine speeds at which the engine of the truck can operate the power take-off (PTO) assembly. If the operator needs to change any of these speeds, they must visit a technician that can alter any of these speed by using specialized tools and software, which are very costly. Further, the technician can also alter these speeds only by a multiple of 5 RPMs and cannot set any of these speed to a user desirable number that may not be divisible by 5. However, an operator of a truck generally desires to calibrate the engine of their truck to run at an "optimum" speed determined by the specialized equipment specifications, PTO and transmissions ratios, to, for example, to calibrate an engine speed of 974 RPM, which cannot be performed even by the use of this specialized software and tools.

Therefore, there exists a need for a technology where an operator can calibrate a desirable speed without altering any of the three pre-set speeds, without the need of reaching out to a technician or without the help of expensive tools and software.

SUMMARY OF THE DISCLOSURE

Before the present method, apparatus and hardware are described, it is to be understood that this invention is not limited to the particular systems and methodologies described, as there can be multiple possible embodiments of the present invention which are not expressly illustrated in the present disclosure. It is also to be understood that the terminology used in the description is for the purpose of describing the particular versions or embodiments only and is not intended to limit the scope of the present invention which will be limited only by the appended claims.

In an embodiment, the present disclosure describes a method of calibrating a desirable engine speed for power take-off (PTO) operation. The method comprises receiving, via a user interface of an instrument cluster unit (ICU), a desirable speed value from an operator, wherein the ICU is configured to enable the operator to select the desirable speed value between minimum and maximum speed values defined for a PTO operation. The method further comprises sending the desirable speed value to a signal actuation module (SAM), wherein the SAM, upon receipt of the desirable speed value, is configured for storing the desirable speed value and communicating the desirable speed value to a common power-train control unit (CPC). The method further discloses the step of modifying, via the CPC, one or more engine parameters to attain the desirable speed value for operating at least one PTO.

In one embodiment, the present disclosure describes that the step of modifying further includes adjusting, by a programmable engine control unit (ECU), the one or more engine parameters, based on the desirable engine speed value and providing, by the programmable ECU, the adjusted one or more parameters to a transmission control unit (TCU) for attaining the desirable engine speed for operating the PTO.

In one embodiment, the present disclosure describes indicating an error signal, via the user interface, when the desirable speed value selected by the operator is below the minimum speed value or above the maximum speed value defined for the PTO operation.

In another embodiment, the present disclosure describes a system configured to calibrate a desirable engine speed for PTO operation. The system discloses having an ICU comprising a user interface to enable an operator to select the desirable engine speed for PTO operation, wherein the ICU is configured to enable the operator to select the desirable speed value between minimum and maximum speed values defined for PTO operation. The system further comprises a SAM operatively coupled to the ICU. The SAM is configured to receive the desirable speed value and store the desired speed value. The system further discloses having a CPC unit operatively coupled to the SAM. The CPC is configured to receive the desired speed value from the SAM and modify one or more engine parameters to attain the desirable speed value for operating an engine in PTO.

In one embodiment, the present disclosure describes that the CPC unit further comprises a programmable engine control unit (ECU). The ECU is configured to adjust the one or more engine parameters, based on the desirable engine speed value, and provide the adjusted one or more parameters to a transmission control unit (TCU) to attain the desirable engine speed for operating the PTO.

In one embodiment, the present disclosure describes that the SAM is configured to store the desirable speed value as a fourth speed until a new value is selected by the operator.

In one embodiment, the present disclosure describes that the SAM is configured to have a pre-defined value of the fourth speed when initialized for the first time.

In one embodiment, the present disclosure describes that the ICU further includes an error detecting unit configured to detect an error when the desirable speed value selected by the operator is below the minimum speed value or above the maximum speed value defined for PTO operation.

BRIEF DESCRIPTION OF DRAWINGS

The novel features and characteristics of the disclosure are set forth in the appended claims. The disclosure itself, further objectives and advantages thereof, will best be understood by reference to the following detailed description of an illustrative embodiment when read in conjunction with the accompanying drawings. One or more embodiments are now described, by way of example only, with reference to the accompanying drawings wherein like reference numerals represent like elements and where:

Figure 1A:
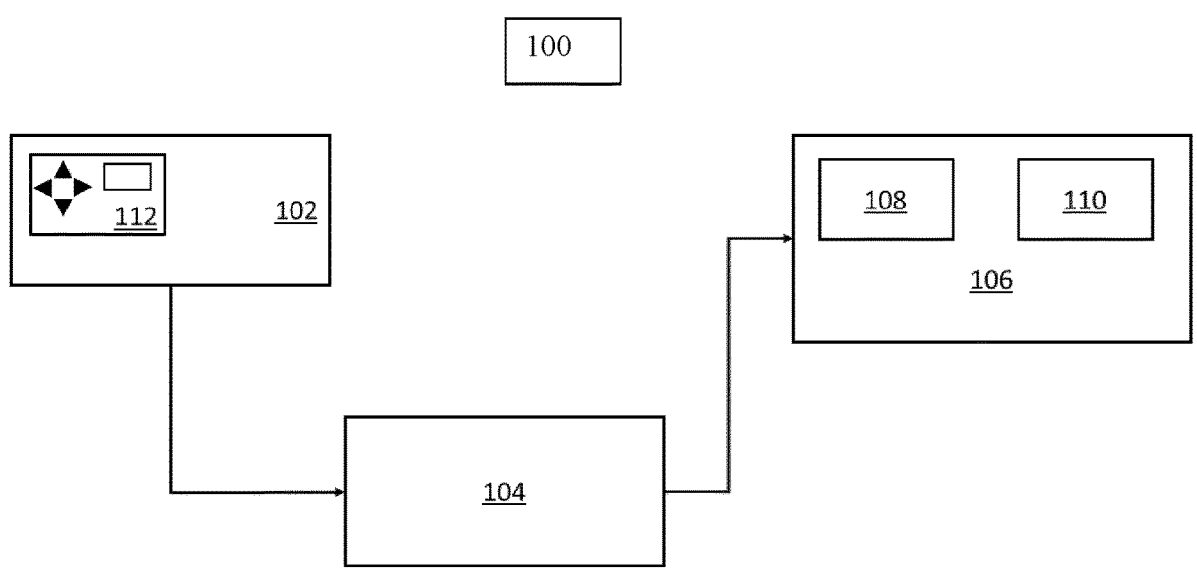
FIG. 1A represents a system for calibrating a desirable engine speed for power take-off (PTO) operations, by way of a block diagram, in accordance with an embodiment of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such an item or items or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred systems and methods are now described.

The elements illustrated in the figures inter-operate as explained in more detail below. Before setting forth the detailed explanation, however, it may be noted that all of the discussion below, regardless of the particular implementation being described, is exemplary in nature, rather than limiting.

The techniques described herein may be implemented using one or more computer programs executing on (or executable by) a programmable computer including any combination of any number of the following: a processor, a sensor, a storage medium readable and/or writable by the processor (including, for example, volatile and non-volatile memory and/or storage elements), plurality of input units, plurality of output devices and networking devices.

Each computer program within the scope of the claims below may be implemented in any programming language, such as assembly language, machine language, a high-level procedural programming language, or an object-oriented programming language. The programming language may, for example, be a compiled or interpreted programming language. Each such computer program may be implemented in a computer program product tangibly embodied in a machine-readable storage device for execution by a computer processor.

Method steps as disclosed by the present disclosure may be performed by one or more computer processors executing a program tangibly embodied on a non-transitory computer-readable medium to perform functions of the invention by operating on input and generating output. Suitable processors include, by way of example, both general and special purpose microprocessors. Generally, the processor receives (reads) instructions and content from a memory (such as a read-only memory and/or a random-access memory) and writes (stores) instructions and content to the memory. Storage devices suitable for tangibly embodying computer program instructions and content include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially designed ASICs (Application-Specific Integrated Circuits) or FPGAs (Field-Programmable Gate Arrays).

FIG. 1A discloses a system 100 configured to calibrate a desirable engine speed for power take-off (PTO) operation in vocational trucks (not shown). The system 100 discloses having an instrument cluster unit (ICU) 102 that allows an operator (not shown) to select the desirable engine speed for PTO operation. In an aspect, the ICU 102 may be a dedicated computer resident inside the vocational truck that allows the operator to set the desirable value as a fourth speed for PTO operation. More specifically, to allow the operator to calibrate the desirable fourth speed, the ICU 102 comprises a user interface (UI) 112. Those skilled in the art will appreciate that the UI 112 may include a keyword (not shown) to allow the operator to select a value that he or she wants as their desirable fourth speed, a display (not shown) to display the value selected by the operator, and other hardware limitations that may be necessary for the ICU 102.

Further, it is to be appreciated that the ICU 102 is programmed to allow the operator to enter a speed value between the minimum speed value and the maximum speed value defined for PTO operation. In an exemplary embodiment, if the operator selects the fourth speed value below the minimum speed value defined for PTO operation or above the maximum speed value defined for PTO operation, an error detection unit (not shown) may be configured to detect the defective value and indicate an error to the operator.

Those skilled in the art will appreciate, in one embodiment, that the UI 112 may be a separate panel (not shown), other than the dashboard of the truck, attached to the ICU 102, when the ICU 102 is placed in proximity of the dashboard of the truck. In another embodiment, the UI 112 may be a part of the panel mounted on the dashboard of the truck, when the instrument cluster unit (ICU) 102 is placed at a distant location.

The system 100 further discloses having a signal actuating module (SAM) 104. The SAM 104 may be operatively coupled to the ICU 102 to receive the desirable speed, selected by the operator, from the ICU 102. In an aspect, the SAM 104 may be configured to receive the desirable speed value from the ICU 104 via at least one of a wireless or wired means. The SAM 104 may further include a non-volatile memory (not shown) configured to store the value of the desirable fourth speed received from the ICU 102 for future operations. The stored value of the desirable fourth speed can be saved over at least one but preferably for multiple battery disconnect cycles, thus saving the operator time in only having to set the fourth speed once even though e.g. frequent vehicle battery replacement is required. In an embodiment, the desirable speed value may remain stored as a fourth speed inside the memory of the SAM 104, unless a new desirable speed value is received by the SAM 104 from the ICU 104.

Figure 1B:
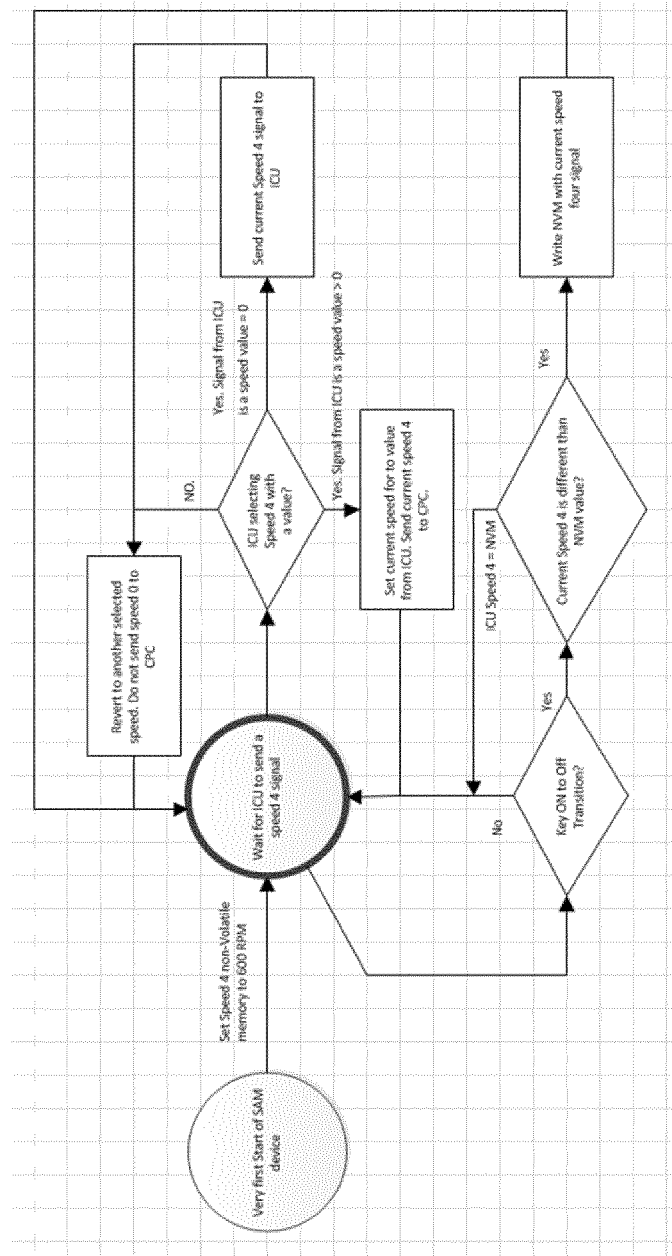
FIG. 1B represents logic for a fourth speed inside the signal actuating module (SAM), by way of a flow diagram in accordance with an embodiment of the present disclosure.
Figure 1C:
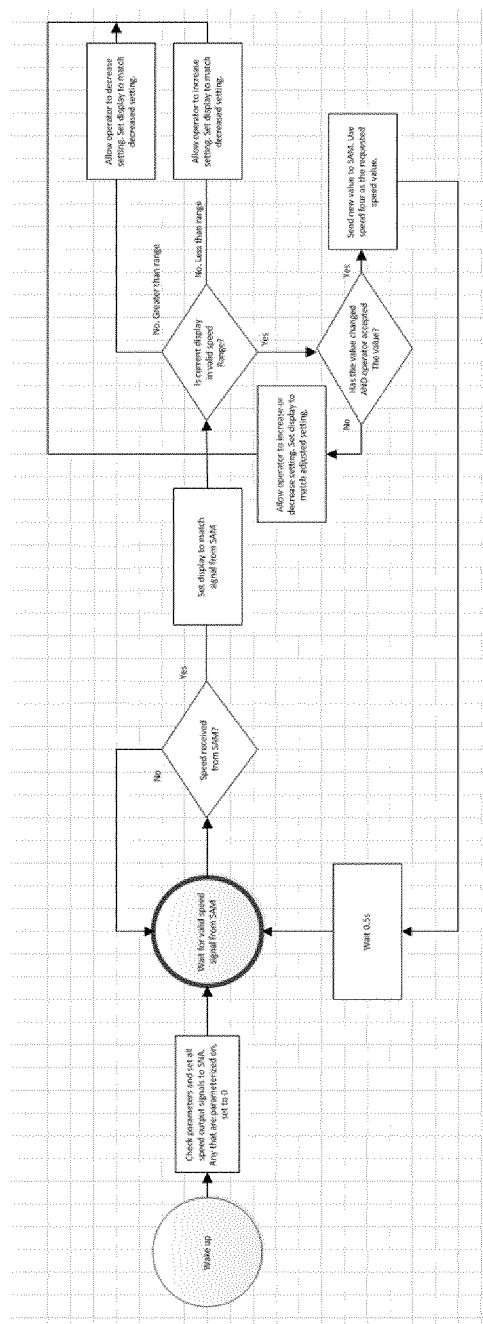
FIG. 1C represents logic for the fourth speed inside the Instrument cluster unit (ICU), by way of a flow diagram, in accordance with an embodiment of the present disclosure.

It may be further noted, like the ICU 102, the SAM 104 may be a separate computing device. Further, the two computing devices 102 and 104 interact with each other every time the operator uses the ICU 102 to calibrate the desirable engine speed for PTO operation. In particular, these two computers 102 and 104 are configured to communicate with each other. FIGS. 1B and 1C disclose the interaction between the ICU 102 and the SAM 104 in detail in the paragraphs below.

Coming back to FIG. 1A, the system 100 further discloses having a common power-train control (CPC) unit 106. The CPC unit 106 may remain operatively coupled to the SAM 104. In particular, the CPC unit 106 may be configured to receive the desirable speed value from the SAM and modify one or more engine parameters to attain the desirable engine speed for operating an engine in PTO mode.

In an aspect, to modify the one or more engine parameters, the CPC unit 106 may include a programmable engine control unit (ECU) 108, as shown in FIG. 1A. The programmable ECU 108 may be configured to analyze the value of the fourth desirable speed and change the one or more engine parameters to achieve the desirable fourth engine speed, selected by the operator. In particular, to achieve the desirable fourth speed, the ECU 108 may be further configured to pass on the changed one or more engine parameter values to a transmission control unit (TCU) 110, resident inside the CPC unit 106, which in turn is configured to achieve the desirable fourth speed.

FIG. 1B discloses fourth speed logic inside the SAM 104, along with the interaction of the SAM 104 with the ICU 102. As can be seen from FIG. 1B, at the beginning, the SAM 104 waits for the ICU 102 to send a fourth speed signal. In one embodiment, it is to be noted that when the SAM 104 is initiated for the first time, there is no fourth speed value defined by the operator. However, since the SAM 104 cannot have a value of zero, a default fourth speed value is calibrated and stored inside the memory of the SAM 104.

FIG. 1B, further discloses that once the SAM 104 has received a fourth speed signal from the ICU 102, the SAM 104 checks whether the value received from the ICU 102 is greater than zero, and if it is, the SAM 104 sets the current speed as the fourth speed and sends the fourth speed to the CPC unit 106 for further processing, as discussed above. However, if the value received from the ICU 102 is not greater than zero, then the SAM 104 does not send the received speed to the CPC unit 106 and instead reverts to another selected speed. In one embodiment, the another selected speed may be one of the three pre-set speed values which are factory fitted and have values those cannot be altered by the operator.

Further, in an embodiment, if the SAM 104 detects that the value received from the ICU 102 is equal to zero, then the SAM 104 does not send the received speed (which is zero) to the CPC unit 106 and instead reverts to another selected speed, as discussed above. Further, FIG. 1B illustrates the logic of storing the selected speed value as the fourth speed in the SAM 104. In particular, it explains that if the current fourth speed value received from the ICU 102 is different than the fourth speed value previously stored in the SAM 104, during a key "ON" to "OFF" transition, the current value is stored as the fourth speed value in the memory of the SAM 104.

Similar to FIG. 1B, FIG. 1C illustrates fourth speed logic inside the ICU 102, along with the interaction of the ICU 102 with the SAM 104. FIG. 1C discloses at the first step that the ICU 102 waits for further processing, until it receives a valid speed signal from the SAM 104. In one embodiment, when the ICU 102 is initialized, the ICU 102 checks parameters and sets all speed output signals to "signal not available" (SNA) and any parameters that are "ON" are set to zero.

Further, once the ICU 102 has received the speed signal from the SAM 104, it sets the display to match the signal received from the SAM 104. The ICU 102 now determines whether the current value displayed on the display is a valid value or not. In an aspect, the ICU 102 may include a processor (not shown) configured to determine whether the current value displayed on the display is a valid value or not with the help of a memory (not shown).

In one embodiment, if the value is greater than the valid range, then an error detection unit (not shown) of the ICU 102 informs the error to the operator, thus allowing the operator to decrease the speed value to a valid value i.e. within the range defined. Similarly, if said value is less than the valid range, then again the error detection unit (not shown) of the ICU 102 informs the error to the operator, thus allowing the operator to increase the speed value to a valid value i.e. within the range defined.

In another embodiment, if the ICU 102 determines that the current value displayed on the display is a valid speed range, it checks if the operator has accepted the value or not. If the operator has accepted the value, the ICU 102 sends this value to the SAM 104 as the fourth speed value. If the operator has not accepted the value, the ICU 102 allows the operator to increase or decrease the value and set display to match the adjusted setting. In an embodiment, the terms desirable speed, desirable fourth speed and fourth speed may be used interchangeably throughout the specification and should not be concluded to be limiting in any sense.

Additional details with respect to functionalities of the various units disclosed in the system 100 are described in the following paragraphs.

Figure 2:
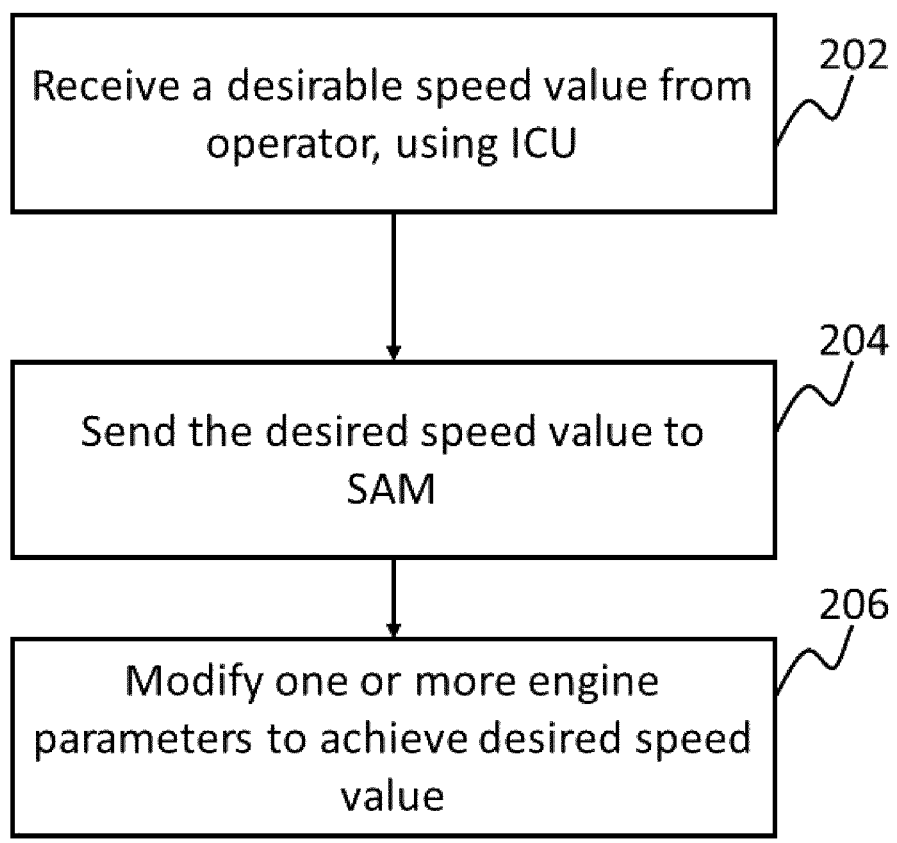
FIG. 2 represents a method of calibrating the desirable engine speed for PTO operations, by way of a flow diagram, in accordance with an embodiment of the present disclosure.

The method 200 of FIG. 2 illustrates, at step 202, receiving a desirable speed value from the operator via the ICU 102. In an embodiment, the ICU 102 may include the UI 112 that enables the operator to select the desirable speed value between minimum and maximum speed values defined for PTO operation. Further, the desirable speed value selected by the operator is a fourth speed, which is different from the other three pre-set speed calibrated for PTO operations.

The method 200 further illustrates, at step 204, sending the desired speed value to the SAM 104. In an aspect, the SAM 104 may be operatively coupled to the ICU 102 for receiving the desirable fourth speed value from the ICU 102. Upon, receiving the fourth speed value, the SAM 104 may be configured for first storing the desirable fourth speed value and simultaneously communicating the speed value to the CPC 106. Those skilled in the art will appreciate that the CPC 106 may remain operatively coupled with the SAM 104 to receive the desirable speed signal from the SAM 104.

In step 206, the method discloses modifying, by the CPC 106, one or more engine parameters to attain the speed corresponding to the desirable speed value, for operating an engine in PTO mode. In an embodiment, the CPC 106 may be programmed to modify the one or more engine parameters based on the received desirable speed value.

In another embodiment, the step of modifying, as illustrated in step 206, may be performed by the ECU 108 configured inside the CPC 106. The ECU 108 may be pre-programed to change one or more engine parameters based on the desirable speed value received from the SAM 104.

In another aspect, once the one or more engine parameters are changed by the ECU 108, they may be sent to the transmission control unit (TCU) 110. The TCU 110 may remain operatively couple to the ECU 108. The TCU 110 may then, based on the one or more modified parameters, make the necessary changes to achieve the desirable engine speed that corresponds to the desirable speed value, to perform the required PTO operations.

While various aspects and embodiments have been disclosed herein, other aspects and embodiments will be apparent to those skilled in the art. It may be pertinent to note that various aspects and embodiments disclosed herein are for purposes of illustration and are not intended to be limiting, with the true scope being indicated by the following claims.

REFERENCE NUMERALS

| Reference numbers | Description |
| --- | --- |
| 100 | System for calibrating desirable engine speed |
| 102 | Instrument cluster unit |
| 104 | Signal actuating module (SAM) |
| 106 | Common power-train controller (CPC) |
| 108 | Engine control unit (ECU) |
| 110 | Transmission control unit (TCU) |
| 112 | User Interface (UI) |
| 200 | Method |
| 202-206 | Method Steps for calibrating desirable engine speeds |

We claim:

1. A method of calibrating desirable engine speed for power take-off (PTO) operation, the method comprising:
receiving, via a user interface of an instrument cluster unit (ICU), a desired speed value from an operator, wherein the ICU is configured to enable the operator to select the desired speed value between minimum and maximum speed values defined for PTO operation;
sending the desired speed value to a signal actuation module (SAM), wherein the SAM, upon receipt of the desired speed value, is configured for:
storing the desired speed value for at least one battery disconnect cycle; and
communicating the desired speed value to a common power-train control (CPC) unit.

2. The method of claim 1, further comprising indicating an error signal, via the user interface, when the desired speed value selected by the operator is below the minimum speed value or above the maximum speed value defined for PTO operation.

3. A system configured to calibrate desirable engine speed for power take-off (PTO) operation, the system comprising:
an instrument cluster unit (ICU) comprising a user interface to enable an operator to select a desired engine speed value for PTO operation, wherein the ICU is configured to enable the operator to select the desired engine speed value between minimum and maximum speed values defined for PTO operation;
a signal actuating module (SAM) operatively coupled to the ICU, and configured to:
receive the desired engine speed value;
store the desired engine speed value for at least one battery disconnect cycle; and
a common power-train control (CPC) unit operatively coupled to the SAM, the CPC unit being configured to:
receive the desired engine speed value from the SAM.

4. The system of claim 3, wherein the SAM is configured to store the desired engine speed value as a particular speed value used for future PTO operations until a new desired engine speed value is selected by the operator.

5. The system of claim 3, wherein the SAM is configured to have a pre-defined value of a first speed when initialized for the first time.

6. The system of claim 3, wherein the ICU further includes an error detecting unit configured to detect an error when the desired engine speed value selected by the operator is below the minimum speed value or above the maximum speed value defined for PTO operation.

7. A system configured for calibrating desirable engine speed for power take-off (PTO) operation, the system comprising:
an instrument cluster unit (ICU) comprising a user interface;
a signal actuating module (SAM) operatively coupled to the ICU;
a common power train controller (CPC); and
an engine configured for PTO operation, wherein the engine is operatively coupled to the CPC, and wherein the CPC stores instructions in non-transitory memory that, when executed, cause the CPC to:
detect a vehicle-on event, and in response:
in a first condition, send a pre-defined speed value stored in the SAM to the CPC, if no operator input with a desired speed value has been received at the user interface of the ICU and stored in the SAM, and
in a second condition, send a desired speed value stored in the SAM to the CPC, based on the desired speed value having been received at the user interface of the ICU; and
in the first condition, operate the engine at a first speed responsive to a PTO condition, and in the second condition, operate the engine at a second speed responsive to a PTO condition, wherein the first speed and the second speed are different.

8. The system of claim 7, wherein the SAM is configured to store the desired speed value as a particular speed value used for future PTO operations.

9. The system of claim 7, wherein the SAM is configured to store the desired speed value for at least one battery disconnect cycle.

10. The system of claim 7, wherein the ICU is configured to indicate an error signal at the user interface in response to the user interface receiving an operator input with a desired speed value that is below a minimum speed value or above a maximum speed value, and wherein the SAM is configured to not store a desired speed value associated with the error signal.

11. The system of claim 7, wherein the SAM is configured to store the desired speed value as a particular speed value used for future PTO operations until a new desired speed value is received at the user interface.

12. The system of claim 7, wherein, if the desired speed value received at the user interface is different than a particular speed value stored in the SAM for future PTO operations, the SAM is configured to store the desired speed value received at the user interface as the particular speed value for future PTO operations.

13. The system of claim 7, wherein the SAM is configured to have a default value of a first speed when initialized for the first time.

* * * * *